ns patent office 2,843,006
Patented July 15, 1958

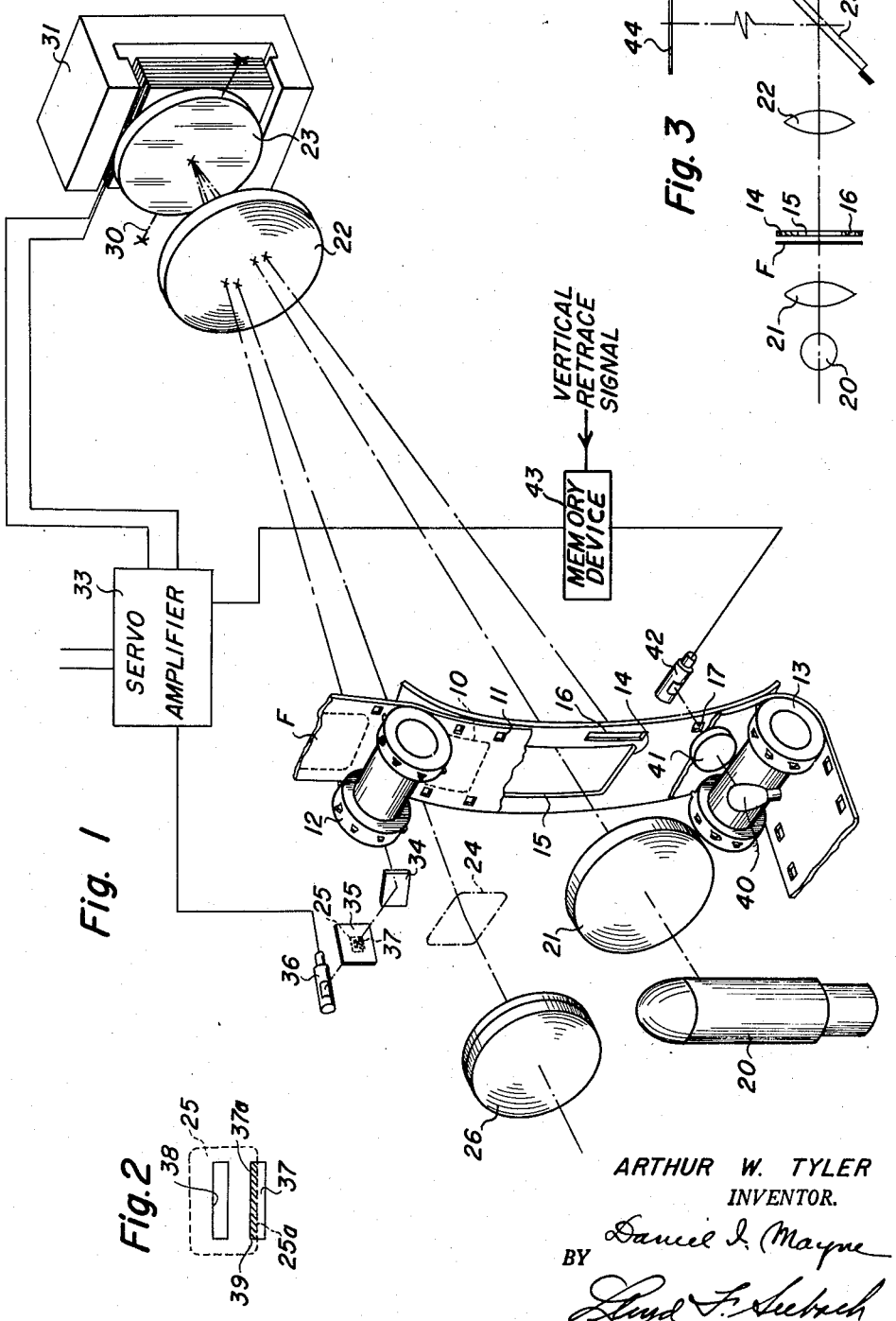

2,843,006

CONTINUOUS FEED MOTION PICTURE PROJECTOR

Arthur W. Tyler, Rochester, N. Y., assignor to Eastman Kodak Company, Rochester, N. Y., a corporation of New Jersey Application September 9, 1952, Serial No. 308,562

1 Claim. (Cl. 88—16.8)

This invention relates to photography and more particularly to projection apparatus for motion pictures in which the film strip is moved continuously past the frame or projection aperture.

Many systems have been devised in which the film strip is moved continuously through a film gate and past a frame aperture. In many of these systems, tilting and/or rotating mirrors have been utilized to compensate for the film motion whereby a stationary image is produced on the screen. With the advent of television, the need for such a projector has become greater than ever. To produce a stationary image on the screen, the prior art teaches the use of rotating mirrors which are usually of two types. In the first type, the reflecting means comprises two semi-circular mirrors which are mounted for rotation and are tilted independent of each other by suitable cam members. The second type comprises a plurality of mirrors arranged about a cylindrical drum which is rotated so that each successive image is reflected by each successive mirror. The drum is rotated at a constant speed and in the latest refinement of this system, each mirror is free to rotate about an axis in the plane of its reflecting surface as it reflects its respective image. In this manner, the image projected is continuous, one mirror alone being active for a portion of the time and two mirrors being active during the transition from one mirror to the next.

Both of these systems, because of the space or gaps between the mirrors produces a vignetting effect or flicker. This effect is the result of the change in the amount of light transmitted by the system when two mirrors are active in the light path. Further, these systems are subject to vertical jitter, a slight upward or downward motion of the projected image with respect to the frame edges. This effect arises mainly from the difficulty of maintaining absolute uniformity of film motion in the gate. Vertical jitter, as well as film shrinkage, has been one of the outstanding objections to continuous or non-intermittent types of projectors. As a result, it is necessary to provide many types of adjustments which can only be maintained by a highly skilled and trained operator.

In the present invention, the film is driven continuously through a film gate at any desired speed. Light from a lamp and condenser system passes, respectively, through the film and objective lens, is reflected by a compensating mirror back through the objective lens and, after forming a real image of the image area on the film, passes through a relay or projection lens to the screen. The illumination system also illuminates the film perforations and light passing therethrough traverses substantially the same path as the image area. At a point ahead of the real image of the image area the projected image of the perforation is intercepted by a mirror and the real image is superimposed on a mask provided with a slit. One edge of the slit and an edge of the real image of the perforation produce a slit of variable width which transmits light for controlling a photocell connected to a servo amplifier. The output of the servo amplifier drives an electromagnetic motor which rotates the compensating mirror about an axis normal to the direction of film movement and causes the image area and perforation images to move in the same manner. Since the servo amplifier is designed according to well-known principles to position the mirror such that the illumination falling on the photocell is substantially constant at all times, it is apparent that this action causes the image of the perforation to be stationary with respect to the mask and that the image of the image area is also maintained stationary. An auxiliary light source and photocell is utilized to monitor the position of the film frame through use of the film perforations. When the film has advanced to the point where the next frame should be projected, the monitoring circuit sends a signal to the servo amplifier which then drives the compensating mirror backward until it encounters and locks onto the succeeding image area to again produce a stationary image. The signal generated by the photocell is derived from the light which is transmitted through the film perforations by the auxiliary light source and, hence, is intermittent. By the time the transmitted light is insufficient to activate the photocell and generate a signal, the compensating mirror has been driven backward by the servo amplifier to its normal position, the time interval being less than that of the retrace period of a television system. At the instant the servo amplifier reverses its direction of drive so that the compensating mirror is again driven forward in synchronism with the succeeding frame, the servo amplifier is said to be locked to the image area that it is maintaining stationary by virtue of the movement of the mirror.

The present invention, therefore, overcomes the disadvantages of the systems disclosed in the prior art in that flicker is eliminated because at no time are two mirrors active during the transition from one frame to another. As a result, the projected image is maintained at a uniform brightness. Further, vertical jitter is eliminated in the present invention because the structure set forth maintains a stationary image which is not affected by film shrinkage, nonuniformities in the film motion, or distortions in the mechanical structure of the projector. The images are maintained stationary in spite of these disturbances by virtue of the feed-back characteristics of the servo mechanism as contrasted to some of the techniques disclosed by the prior art.

The primary object of the invention is, therefore, to provide in a continuous motion picture projector means for producing a stationary image of uniform brightness which is free from disturbances caused by film shrinkage and imperfections in the projector mechanism.

Another object of the invention is to provide in a continuous motion picture projector a photoelectric device arranged to be energized by variations in the positions of the projected image for controlling a servo amplifier, the output of which is connected to an electromagnetic means forming a closed feed-back loop for driving a compensating mirror which maintains the projected image stationary, of uniform brightness, and free of disturbances.

Yet another object of the invention is to provide in a continuous motion picture projector a photoelectric device actuated by light transmitted through a variable width slit defined by an edge of a slit in a mask and an edge of the real image of the film perforation for controlling through a servo amplifier the movement of an optical compensating mirror and a second photoelectric device, or monitoring device, actuated by the light transmitted through the film perforations for causing the servo amplifier to drive the compensating mirror backward until it encounters the next or succeeding frame and is locked thereto.

And still another object of the invention is to provide in a continuous motion picture projector means whereby the optical efficiency of the projector is increased and the projector is made readily and easily adaptable to the uses of television.

Other objects and advantages will be apparent to those skilled in the art by the description which follows.

Reference is now made to the accompanying drawing wherein like reference numerals designate like parts and wherein:

Fig. 1 is a diagrammatic perspective view of the pertinent elements of a continuous motion picture projector and showing particularly the photoelectric devices for controlling the optical compensating mirror through the servo amplifier and also showing how the projector may be adapted to television use;

Fig. 2 is a detail view and showing the relation of the edge of the real image of the perforation or control aperture with respect to an edge of the slit in the mask whereby an illuminated slit of variable width is produced; and Fig. 3 is a schematic view of another optical system in which the invention may be embodied but from which the power source, electromagnetic means and photoelectric control devices have been omitted.

In the illustrated embodiment of the invention, the film strip F is provided with image or picture areas 10 and perforations 11 arranged along one or both edges thereof as is well-known in the art. The film strip F is moved continuously by sprockets 12 and 13 which are rotated in any well known manner. Sprockets 12 and 13 move film strip F continuously through film gate 14 which is provided with frame or projection aperture 15, control aperture 16 and monitoring aperture 17. Aperture 15 is at least twice the length of image area 10 and when used in conjunction with television should be at least 2⅓ times the length of image area 10, as is well-known in the art. Apertures 16 and 17 are spaced along the edge of gate 14 in accordance with the lateral location of perforations 11, aperture 16 being at least as long as image area 10 and aperture 17 being at least of the same dimensions as perforations 11. Gate 14 is preferably curved in order that the angular rate of advance of the film strip will be the same for all points in the film gate. In the event nonperforated film is used, sprockets 12 and 13 may be replaced by suitable friction drive rolls and the film perforations may be replaced by light transmitting areas which are exposed at the same time as the film strip. Light transmitting areas, therefore, may be defined as actual apertures in the film strip or exposed areas.

The image area aligned with frame aperture 15 is illuminated by lap 20 and condenser lens system 21. The light beam is of sufficient size so that aperture 16 is also illuminated. Light passing through an image area 10 and aperture 15 passes through objective 22 and is reflected by optical compensating mirror 23 back through objective 22 which forms a real image of area 10 at 24 which is substantially in the plane of aperture 15 and to one side of gate 14. In a like manner, the light passing through perforations 11 and aperture 16 passes through objective 22 and forms a real image at 25 of perforation 11 for a purpose hereinafter described. Through lens 26, the real image of image area 10 is projected onto a suitable screen, not shown in Fig. 1 and indicated at 44 in Fig. 3.

Compensating mirror 23 is pivotally mounted for rotation about an axis 30 which is normal to the direction of film movement and coincident with the reflecting surface thereof. Through a suitable electromagnetic means 31 which is secured to mirror 23, the mirror is turned about axis 30. The power source for electromagnetic means 31 is a servo amplifier 33 whose output is connected thereto. Through servo amplifier 33, mirror 23 is pivoted about axis 30 in synchronism with the movement of film strip F so that the images 24 and 25 are made stationary as well as real.

Interposed in the optical path of the projected image of perforation 11 is a fixed mirror 34 which superimposes the real image 25 of perforation 11 on mask 35 arranged in front of photocell 36 which is connected to servo amplifier 33. Mask 35 is provided with slits 37 and 38 which are arranged with respect to real image 25, as shown in Fig. 2. The edge 37a of aperture 37 and edge 25a of the real image of perforations 11 form a variable width slit 39, the light passing through said slit falling on photocell 36 to control the output of servo amplifier 33 and, hence, the movement of mirror 23. This movement of mirror 23 causes both the image area and perforation images 24 and 25, respectively, to move in substantially the same manner. Any variations, therefore, that may result because of film shrinkage, etc. are immediately compensated for so that the stationary images are not affected. In order to eliminate any differences in illumination of apertures 15 and 16 that may be caused by lamp 20, slit 38 is provided as a reference for photocell 36.

An auxiliary light source 40 and condenser lens 41 are aligned with aperture 17 so that the light transmitted through each of perforations 11 as they move past aperture 17 falls on photocell 42 which can be connected directly to servo amplifier 33 or to memory device 43 for a purpose described hereinafter. This second photoelectric device is used to monitor the position of the film frame. When the film strip F has advanced to the point where the next frame should be projected, the light transmitted through aperture 17 activates photocell 42, which, in turn, send a signal to the servo amplifier 33. This signal causes servo amplifier 33 to drive mirror 23 backward until it encounters the next or succeeding image area on film F which is in aperture 15. The servo amplifier then locks onto that frame to again produce a stationary image. Suitable stops may be provided to position mirror 23 in its normal position. The servo is designed to have sufficient stiffness and power to advance the mirror to the next frame and stabilize the image in a time interval that is sufficiently short so that this motion is not detectable to the eye and, consequently, there is no need for a shutter.

The illustrated optical system forms auxiliary images 24 and 25 of unity magnification by reflecting the light from compensating mirror 23 back through objective 22. This is a preferred system since the mirror dimensions are reduced to a minimum and mirror 23 is located in parallel light. However, the invention is applicable to other systems in which mirror 23 reflects the light to one side so that it passes through objective 22 only once, as shown in Fig. 3. In such a system objective 22 serves as the projection lens, mirror 34 may be interposed between objective 22 and the projected image of the perforation, and mirror 23 must of necessity be considerably larger.

This type of continuous projector is particularly adaptable to the projection of motion picture film for television purposes wherein the flying spot scanner is employed. In this application of the invention, the mirror 23 is driven backward until it encounters the next or succeeding frame in synchronism with the television scanning so that the unwanted image motion occurs during the vertical retrace period when an image is not required. This synchronization is accomplished independently of the rate at which the film is moving by the frame monitoring device comprising auxiliary light source 40, condenser lens 41 and photocell 42 in conjunction with a memory device 43 of any well known structure which is inserted in the line connecting photocell 42 with servo amplifier 33. As a perforation is aligned with aperture 17, photocell 42 generates a signal which is transmitted to memory device 43. The signal is not injected into servo amplifier 33 until the next vertical synchronizing signal arrives from the television system. At this time, the signal from photocell 42 is released and servo amplifier 33 drives compensating mirror 23 backward until it encounters the succeeding frame and is locked thereto. The memory device 43 is then cleared to receive the signal generated by the succeeding film perforation. Projection of the previous frame continues during the waiting period which is always less than $\frac{1}{60}$ second. It is apparent that this method of synchronization functions in the desired manner as long as the film frame rate is less than the television frame rate of 60 per second. The aperture 15 in film gate 14, as is well known and described hereinbefore, must be made larger than two frames in order to accommodate the extra film motion.

Since many other modifications and applications will be suggested and apparent to those skilled in the art, the scope of the invention is pointed out in the appended claim.

Having now particularly described my invention, what I desire to secure by Letters Patent of the United States and what I claim is:

In photographic apparatus, the combination comprising a film strip having image areas and uniformly spaced light-transmitting areas arranged along at least one edge thereof, a film gate provided with a frame aperture, a control aperture and a monitoring aperture, said control and monitoring apertures being spaced longitudinally of said gate and transversely thereof in accordance with said light-transmitting areas, means for continuously moving said film strip through said film gate, a condenser lens system including a lamp for illuminating said frame aperture and said control aperture, a second condenser lens system including a lamp for illuminating said monitoring aperture, a compensating mirror for receiving and reflecting the images of the image area within said frame aperture and of the light transmitting area within said control aperture directed thereto and oscillatable through substantially one-half the angle subtended by the height of said frame aperture and about an axis normal to the direction of film movement, optical means common to said images and arranged in the light path directed to and reflected from said compensating mirror for producing a real image of said image area within said frame aperture and of a light-transmitting area within said control aperture, the real image of said image area being to one side of said film gate and substantially in the plane of said frame aperture, a photoelectric device responsive to variations in the position of the real image of said light-transmitting area within said control aperture for providing an electrical signal, a servo amplifier responsive to said electrical signal for providing an output operatively connected to said electromagnetic means to form a closed feed-back loop for driving said compensating mirror to maintain said real image stationary, and a second photoelectric device associated with said monitoring aperture and operatively connected to said servo amplifier for causing the output thereof, as successive light-transmitting areas are aligned with said monitoring aperture, to drive said compensating mirror in a direction opposed to that of said film strip until it encounters the succeeding image area and said servo amplifier is locked thereto.

References Cited in the file of this patent

UNITED STATES PATENTS

| 1,968,938 | Goldhammer | Aug. 7, 1934 |
| 2,073,637 | Hoorn | Mar. 16, 1937 |
| 2,215,464 | Dorgelo et al. | Sept. 24, 1940 |
| 2,250,938 | Weber | July 29, 1941 |
| 2,506,198 | Charles | May 2, 1950 |
| 2,523,156 | Somers | Sept. 19, 1950 |
| 2,666,356 | Graham et al. | Jan. 19, 1954 |
| 2,770,163 | Mattke | Nov. 13, 1956 |

FOREIGN PATENTS

| 154,222 | Great Britain | Dec. 22, 1921 |

OTHER REFERENCES

"Continuous film scanner for TV," Electronics, volume 24, 1951, pages 114–116.